(12) United States Patent
Huang et al.

(10) Patent No.: US 9,960,546 B2
(45) Date of Patent: May 1, 2018

(54) COILING DEVICE AND HOUSEHOLD APPLIANCE HAVING THE SAME

(71) Applicant: Gree Electric Appliances, Inc. of ZHUHAI, Zhuhai, Guangdong (CN)

(72) Inventors: Haiqiang Huang, Zhuhai (CN); Hui Huang, Zhuhai (CN); Shaolin Chen, Zhuhai (CN); Gang Yao, Zhuhai (CN); Qianglian Lin, Zhuhai (CN); Xubiao Huang, Zhuhai (CN); Xiaoqing Huang, Zhuhai (CN); Ronghua Zhao, Zhuhai (CN)

(73) Assignee: GREE ELECTRIC APPLIANCES, INC. OF ZHUHAI, Guangdong (CN)

( * ) Notice: Subject to any disclaimer, the term of this patent is extended or adjusted under 35 U.S.C. 154(b) by 0 days. days.

(21) Appl. No.: 15/107,057

(22) PCT Filed: Oct. 8, 2014

(86) PCT No.: PCT/CN2014/088146
§ 371 (c)(1),
(2) Date: Jun. 21, 2016

(87) PCT Pub. No.: WO2015/096531
PCT Pub. Date: Jul. 2, 2015

(65) Prior Publication Data
US 2017/0033516 A1    Feb. 2, 2017

(30) Foreign Application Priority Data
Dec. 23, 2013 (CN) .......................... 2013 1 0719359

(51) Int. Cl.
*H01R 13/72* (2006.01)
*H01R 24/30* (2011.01)

(52) U.S. Cl.
CPC ............. *H01R 13/72* (2013.01); *H01R 24/30* (2013.01)

(58) Field of Classification Search
CPC ...... H01R 13/72; H01R 24/30; B23K 9/0286; B23K 9/1336
(Continued)

(56) References Cited

U.S. PATENT DOCUMENTS

| 4,004,747 A | 1/1977 | Schulze | |
| 5,701,981 A * | 12/1997 | Marshall | H02G 11/02 191/12.4 |

(Continued)

FOREIGN PATENT DOCUMENTS

| CN | 201118006 Y | 9/2008 |
| CN | 201174475 Y | 12/2008 |

(Continued)

*Primary Examiner* — Jean F Duverne
(74) *Attorney, Agent, or Firm* — Novick, Kim & Lee, PLLC; Sang Ho Lee

(57) ABSTRACT

The invention discloses a coiling device and a household appliance having same. The coiling device is configured to coil a power cord. The power cord comprises a first segment (91) and a second segment (92) connected to each other. The coiling device includes: a first coiling bobbin (10), provided with a first coiling groove, the first segment of the power cord being wound in the first coiling groove; and a second coiling bobbin (20), connected with the first coiling bobbin fixedly and provided with a second coiling groove, the second segment of the power cord being wound in the second coiling groove, and a winding direction of the second segment of the power cord being identical to that of the first segment of the power cord.

14 Claims, 5 Drawing Sheets

(58) Field of Classification Search
USPC .......................................................... 439/501
See application file for complete search history.

(56) References Cited

U.S. PATENT DOCUMENTS

| | | | | |
|---|---|---|---|---|
| 6,077,108 | A | 6/2000 | Lorscheider et al. | |
| 7,176,411 | B2* | 2/2007 | Enyedy | B23K 9/1336 219/137.2 |
| 7,975,746 | B2* | 7/2011 | Neeper | B29C 63/0013 156/759 |
| 8,809,741 | B2* | 8/2014 | Feldhausen | B23K 9/013 219/137.9 |
| 8,878,097 | B2* | 11/2014 | Enyedy | B23K 9/1336 219/137.2 |
| 9,187,291 | B2* | 11/2015 | Alexandre | B65H 75/34 |
| 9,517,524 | B2* | 12/2016 | Miller | B23K 9/1333 |
| 9,527,153 | B2* | 12/2016 | Miller | B23K 9/0286 |
| 2006/0219359 | A1* | 10/2006 | Miyamoto | B29C 63/0013 156/716 |
| 2008/0037945 | A1 | 2/2008 | Gniadek et al. | |
| 2012/0077372 | A1 | 3/2012 | Montena | |
| 2012/0205477 | A1 | 8/2012 | Whitaker | |

FOREIGN PATENT DOCUMENTS

| | | |
|---|---|---|
| CN | 201515115 U | 6/2010 |
| CN | 203631911 U | 6/2014 |
| GB | 2469302 A | 10/2010 |

\* cited by examiner

COILING DEVICE AND HOUSEHOLD APPLIANCE HAVING THE SAME

TECHNICAL FIELD OF THE INVENTION

The invention relates to the field of household appliances, and in particular to a coiling device and a household appliance having same.

BACKGROUND OF THE INVENTION

Coiling devices are provided in a small number of household appliances in the prior art. However, in a pull-out and withdrawal process of a power cord, it is necessary to adopt an elastic piece and contact structure to solve the problem of connection of a power supply for each of the coiling devices due to mutual conversion of the power cord between a straight line and a circumference, and a potential safety hazard is easily caused by the elastic piece and contact structure due to the problem of reliability.

SUMMARY OF THE INVENTION

The invention aims to provide a coiling device and a household appliance having same, which are intended to improve use safety.

In order to achieve the aim, the invention provides a coiling device, which is configured to coil a power cord. The power cord comprising a first segment and a second segment connected with each other. The coiling device comprises: a first coiling bobbin, provided with a first coiling groove, the first segment of the power cord being wound in the first coiling groove; and a second coiling bobbin, fixedly connected with the first coiling bobbin and provided with a second coiling groove, the second segment of the power cord being wound in the second coiling groove, and a winding direction of the second segment of the power cord being identical to that of the first segment of the power cord.

Furthermore, the coiling device may further comprises a storage assembly, the storage assembly is provided with an accommodating cavity, and when the first segment of the power cord is pulled out of the first coiling bobbin, the second segment of the power cord enters the accommodating cavity from the second coiling groove.

Furthermore, the storage assembly comprises a storage housing and a guide rail arranged therein, and the accommodating cavity is cooperatively formed by the guide rail and the storage housing.

Furthermore, the second coiling bobbin is of an outer gear structure, the storage assembly is of an inner gear structure, the coiling device further comprises a transmission gear, and the transmission gear meshes with the second coiling bobbin and the storage assembly respectively.

Furthermore, the coiling device further comprises a drive assembly in drive connection with the first coiling bobbin.

Furthermore, the coiling device further comprises a housing, the first coiling bobbin is provided on the housing, rotatably and the drive assembly may be a coil spring mounted on the housing and connected with the first coiling bobbin.

Furthermore, a first limiting portion is provided on the first coiling bobbin, and the coiling device further comprises a second limiting portion fitting with the first limiting portions to limit a rotation angle of the first coiling bobbin.

Furthermore, the coiling device further comprising a housing, the first coiling bobbin is provided on the housing rotatably, the first limiting portion is a ratchet provided at the periphery of the first coiling bobbin, and the second limiting portion is a limiting block provided on the housing.

Furthermore, a rotary shaft is provided on the housing, the limiting block is provided on the rotary shaft rotatably, and the limiting block comprises a handle portion arranged outside the housing and a limiting end portion arranged inside the housing, the limiting end portion is matched with the ratchet in a clamping manner.

Furthermore, the second limiting portion further comprises a spring, and the spring which is provided at the housing and is matched with the limiting end portion in a squeezing manner so as to allow the limiting end portion to be clamped with the ratchet under a normal state.

The invention also provides a household appliance, comprising a power cord and an above-mentioned coiling device.

Furthermore, the household appliance comprises an appliance housing, and the coiling device being detachably fixed to an interior of the appliance housing by screws.

By means of the coiling device in the invention, the first coiling bobbin and the second coiling bobbin are arranged, and the winding directions of the first segment and the second segment of the power cord are set to be identical. When the first segment of the power cord is pulled out of the first coiling groove, the first coiling bobbin drives the second coiling bobbin to rotate, and the second segment of the power cord is unwound from the second coiling groove accordingly, so that the power cord is prevented from being twisted at a point of connection between the first segment and the second segment, and therefore the aim of improving the use safety can be achieved without an elastic piece and contact structure.

BRIEF DESCRIPTION OF THE DRAWINGS

The specification drawings forming a part of the invention are intended to provide further understanding of the invention. The schematic embodiments and descriptions of the invention are intended to explain the invention, and do not form improper limits to the invention. In the drawings.

Figure 1:
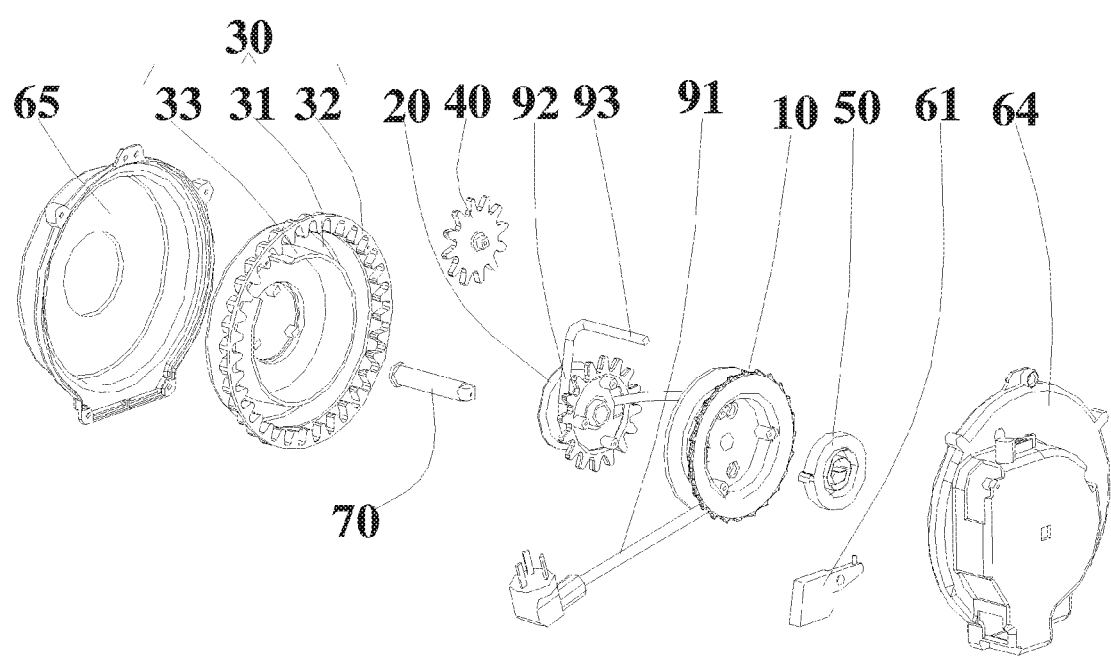
FIG. 1 is an exploded structure diagram of a coiling device according to an embodiment of the invention.

Drawing marks: 10, first coiling bobbin; 11, first limiting portion; 20, second coiling bobbin; 30, storage assembly; 31, accommodating cavity; 32, storage housing; 33, guide rail; 40, transmission gear; 50, drive assembly; 60, housing; 61, limiting block; 611, handle portion; 612, limiting end portion; 62, spring; 63, rotary shaft; 64, mounting box; 65, mounting cover; 70, connecting shaft; 91, first segment; 92, second segment; and 93, third segment.

DETAILED DESCRIPTION OF THE EMBODIMENTS

It is important to note that the embodiments of the invention and the characteristics in the embodiments can be combined under the condition of no conflicts. The invention is described below with reference to the drawings and the embodiments in detail.

As shown in FIG. 1 to FIG. 4, an embodiment of the invention provides a coiling device, which is configured to coil a power cord. The power cord comprises a first segment 91, a second segment 92 and a third segment 93, connected with each other. The coiling device comprises a housing 60, a first coiling bobbin 10 and a second coiling bobbin 20, wherein the first coiling bobbin 10 and the second coiling bobbin 20 are provided inside the housing 60 rotatably. The first coiling bobbin 10 is provided with a first coiling groove, the first segment 91 of the power cord is wound in the first coiling groove, and one end, serving as a free end, of the first segment extends out of the housing 60. The second coiling bobbin 20 is fixedly connected with the first coiling bobbin 10, and the second coiling bobbin 20 is provided with a second coiling groove, the second segment 92 of the power cord is wound in the second coiling groove, and a winding direction of the second segment 92 of the power cord is identical to a winding direction of the first segment 91 of the power cord. The third segment 93 of the power cord is connected with the second segment 92 of the power cord, extends out of the housing 60, and is used as a connecting end of the power cord.

The first coiling bobbin 10 and the second coiling bobbin 20 are provided, and the winding direction of the first segment 91 of the power cord and the winding direction of the second segment 92 of the power cord are set to be identical. When the first segment 91 of the power cord is pulled out of the first coiling groove, the first coiling bobbin 10 drives the second coiling bobbin 20 to rotate, and the second segment 92 of the power cord is unwound from the second coiling groove accordingly, so that the power cord is prevented from being twisted at a point of connection between the first segment 91 of the power cord and the second segment 92 of the power cord, and therefore the aim of improving use safety can be achieved without an elastic piece and an contact structure.

As shown in FIG. 1, the first coiling bobbin 10 and the second coiling bobbin 20 in the embodiment of the invention are fixedly connected by a screw, the circles of the first coiling bobbin 10 and the second coiling bobbin 20 and the axis of the connecting shaft 70 are located on a straight line, and the first coiling bobbin 10 and the second coiling bobbin 20 rotate around the connecting shaft 70.

Specifically, a mounting hole is provided at the first coiling bobbin 10. Correspondingly, a mounting column in fit connection with the mounting hole is provided at a side surface, opposite to the first coiling bobbin 10, of the second coiling bobbin 20. The screw penetrates through the mounting hole and extends to the mounting column, so as to allow the second coiling bobbin 20 to be fixed to the first coiling bobbin 10.

Preferably, a first cord outlet hole is provided at the first coiling bobbin 10, a second cord outlet hole opposite to the first cord outlet hole is provided at the second coiling bobbin 20, a non-free end of the first segment 91 of the power cord penetrates out of the first cord outlet hole, and one end of the second segment 92 of the power cord penetrates out of the second cord outlet hole and is integrally connected with the non-free end of the first segment 91 of the power cord, which penetrates out of the first cord outlet hole.

The coiling device in the embodiment of the invention further comprises a storage assembly 30 fitting with the second coiling bobbin 20, the storage assembly 30 is provided with an accommodating cavity 31, and when the free end of the first segment 91 of the power cord is pulled out of the first coiling bobbin 10, the first coiling bobbin 10 drives the second coiling bobbin 20 to rotate, and the second segment 92 of the power cord performs unwinding operation at the same time. Namely, the second segment 92 of the power cord is unwound from the second coiling groove and enters the accommodating cavity 31 to be stored.

By providing the storage assembly 30, when the second segment 92 of the power cord is unwound from the second coiling groove, the second segment 92 of the power cord, provided outside the second coiling groove, can be accommodated inside the accommodating cavity 31 by means of the storage assembly 30, so as to avoid the problem that the second segment 92 of the power cord is wound inside the coiling device.

As shown in FIG. 1, the storage assembly 30 comprises a storage housing 32 and a guide rail 33 provided in the storage housing 32, and the accommodating cavity 31 is cooperatively formed by the guide rail 33 and the storage housing 32. Preferably, the second coiling bobbin 20 is of an outer gear structure, the storage assembly 30 is of an inner gear structure, the coiling device further comprises a transmission gear 40, and the transmission gear 40 meshes with the second coiling bobbin 20 and the storage assembly 30 respectively. In a clockwise rotation process of the first coiling bobbin 10 and the second coiling bobbin 20 as shown in FIG. 1, the second segment 92 of the power cord is unwound from the second coiling groove, and the storage assembly 30 rotates anticlockwise under an action of the transmission gear 40 to make a movement direction of the guide rail 33 opposite to that of the second coiling bobbin 20. When being unwound from the second coiling bobbin 20, the second segment 92 of the power cord enters the accommodating cavity 31 under the action of the guide rail 33 to be stored.

The guide rail 33 in the embodiment of the invention is an annular guide rail adapting to an inner cavity structure of the storage housing 32, an opening is provided on the annular guide rail, and the third segment 93 of the power cord penetrates from the opening to the exterior of the housing 60. When the coiling device works, the third segment 93 of the power cord remains stationary, and the first segment 91 of the power cord is manually pulled out, so that the second segment 92 of the power cord is unwound from the second coiling groove, a rotation direction of the storage assembly 30 is opposite to a rotation direction of the second coiling bobbin 20, and the second segment 92 of the power cord can enter the accommodating cavity 31 from the opening under the action of the guide rail 33. When the first segment 91 of the power cord is wound, the movement direction of the structure is opposite, and will not be repeated here.

In order to enable the coiling device to realize automatic coiling, the coiling device in the embodiment of the invention further comprises a drive assembly 50 connected with the first coiling bobbin 10 drivably.

Specifically, as shown in FIG. 1, the housing in the embodiment of the invention is provided with a mounting box 64 having a cavity and a mounting cover 65 connected with the mounting box 64 detachably, the first coiling bobbin 10 is provided in the cavity of the mounting box 64 rotatably, and the drive assembly 50 is a coil spring mounted at the mounting box 64 and connected with the first coiling bobbin 10.

Preferably, the coil spring is provided with a middle fixed end and a free end, the middle fixed end of the coil spring is connected with the mounting box 64 fixedly, and the free end of the coil spring is fixed with the first coiling bobbin 10 and rotates along with the first coiling bobbin 10. When the first coiling bobbin 10 rotates clockwise, namely when the first segment 91 of the power cord is pulled out, the coil spring is contracted and tightly coiled to store mechanical energy for spring-back. Otherwise, the mechanical energy in the coil spring is released, and the coil spring shows a tendency to restore an initial position, so as to drive the first coiling bobbin 10 to rotate anticlockwise, and the first segment 91 of the power cord is re-wound into the first coiling groove.

Preferably, a first limiting portion 11 is provided on the first coiling bobbin 10, the coiling device further comprises a second limiting portion fitting with the first limiting portion 11 to limit a rotation angle of the first coiling bobbin 10. The rotation angle of the first coiling bobbin 10 can be limited by means of the first limiting portion 11 and the second limiting portion, so that the pull-out length of the first segment 91 of the power cord can remain unchanged in a non-unlocking state.

The first limiting portion 11 in the embodiment of the invention is a ratchet provided at the periphery of the first coiling bobbin 10, and the second limiting portion is a limiting block 61 provided on the mounting box 64. Specifically, each ratchet has a sliding surface in sliding fit with the second limiting portion in a non-limiting direction (referring to a clockwise direction in the embodiment, namely a pull-out direction of the first segment of the power cord) and a clamping surface clamped with the second limiting portion in a limiting direction.

Figure 2:
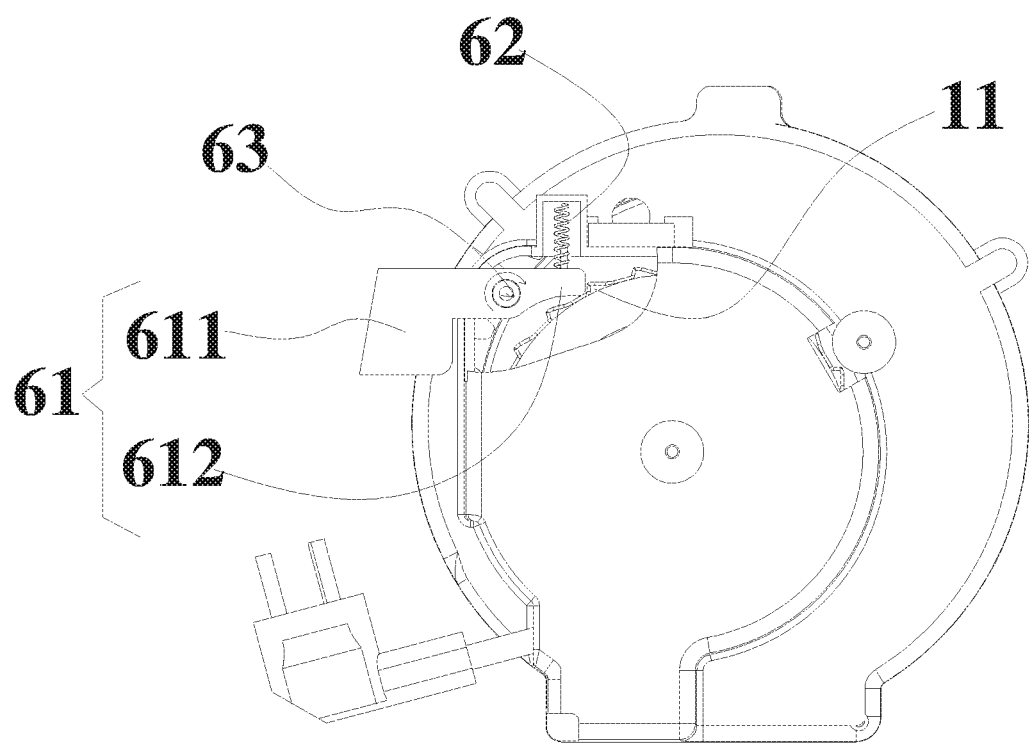
FIG. 2 is a part section view of a locking state of a coiling device according to an embodiment of the invention.
Figure 3:
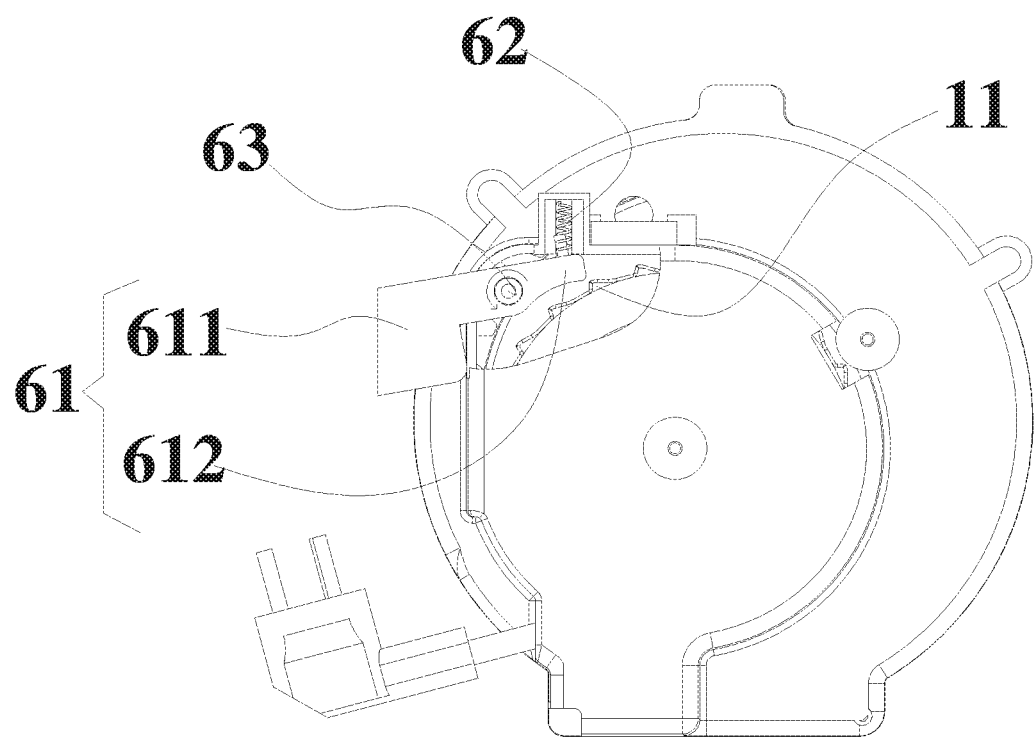
FIG. 3 is a part section view of an unlocking state of a coiling device according to an embodiment of the invention.
Figure 4:
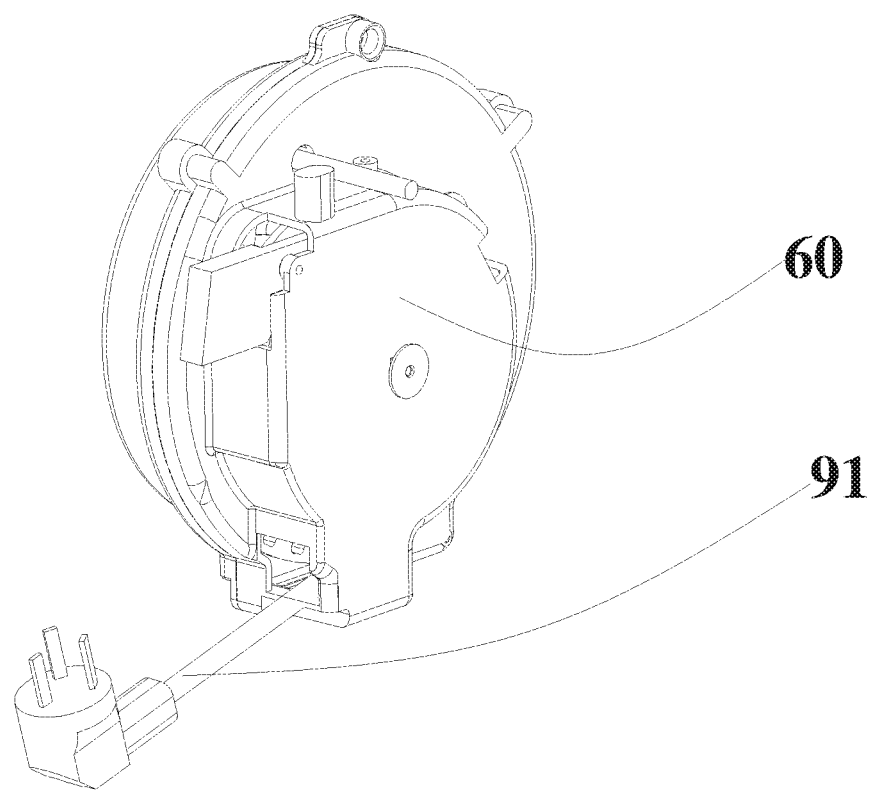
FIG. 4 is an assembly structure diagram of a coiling device according to an embodiment of the invention.

As shown in FIG. 2 and FIG. 3, a rotary shaft 63 is provided at the mounting box 64, the limiting block 61 is provided on the rotary shaft 63 rotatably, and the limiting block 61 comprises a handle portion 611 arranged outside the mounting box 64 and a limiting end portion 612 arranged inside the mounting box 64, the limiting end portion 612 being in clamping fit with the ratchet. When it is necessary to lock the first coiling bobbin 10, the handle portion 611 is lifted to allow the limiting end portion 612 to be pressed down so as to be clamped with the ratchet, thereby limiting the rotation of the first coiling bobbin 10. When it is necessary to unlock the first coiling bobbin 10, the handle portion 611 is pressed down to allow the limiting end portion 612 to be lifted, thereby unclamping the limiting end portion 612 from the ratchet.

Preferably, the second limiting portion further comprises a spring 62, a mounting slot is provided at the mounting box 64, and the spring 62 is provided in the mounting slot and is in extrusion fit with the limiting end portion 612 so as to allow the limiting end portion 612 to be clamped with the ratchets under a normal state. The clamping of the limiting end portion 612 and the ratchet can be remained by means of the spring 62, so as to ensure that the first segment 91 of the power cord can be pulled out for a random length without withdrawal under the driving of the coil spring, thereby avoiding the problem of breakage caused by long-time exertion of a recovery pull force on the power cord in a using process.

An embodiment of the invention also provides a household appliance, which comprises an appliance housing, a power cord and an above-mentioned coiling device. A fixing portion is provided at a housing of the coiling device, a screw penetrates through the fixing portion to entirely fix the coiling device to a set mounting position inside the appliance housing, and a first segment 91 of the power cord is used as a plug connecting end of the household appliance, namely the plug connecting end can be freely pulled out. A second segment 92 of the power cord, serving as a middle transition segment, is provided in the coiling device, and a third segment 93 of the power cord is connected with the second segment 92 of the power cord, extends out of the coiling device and is connected with a corresponding connecting end of the household appliance so as to supply power to the household appliance.

It is important to note that the household appliance comprises a dehumidifier, a humidifier, a dust collector and the like. All household appliances having the coiling devices shall fall within the protection scope of the invention.

Figure 5:
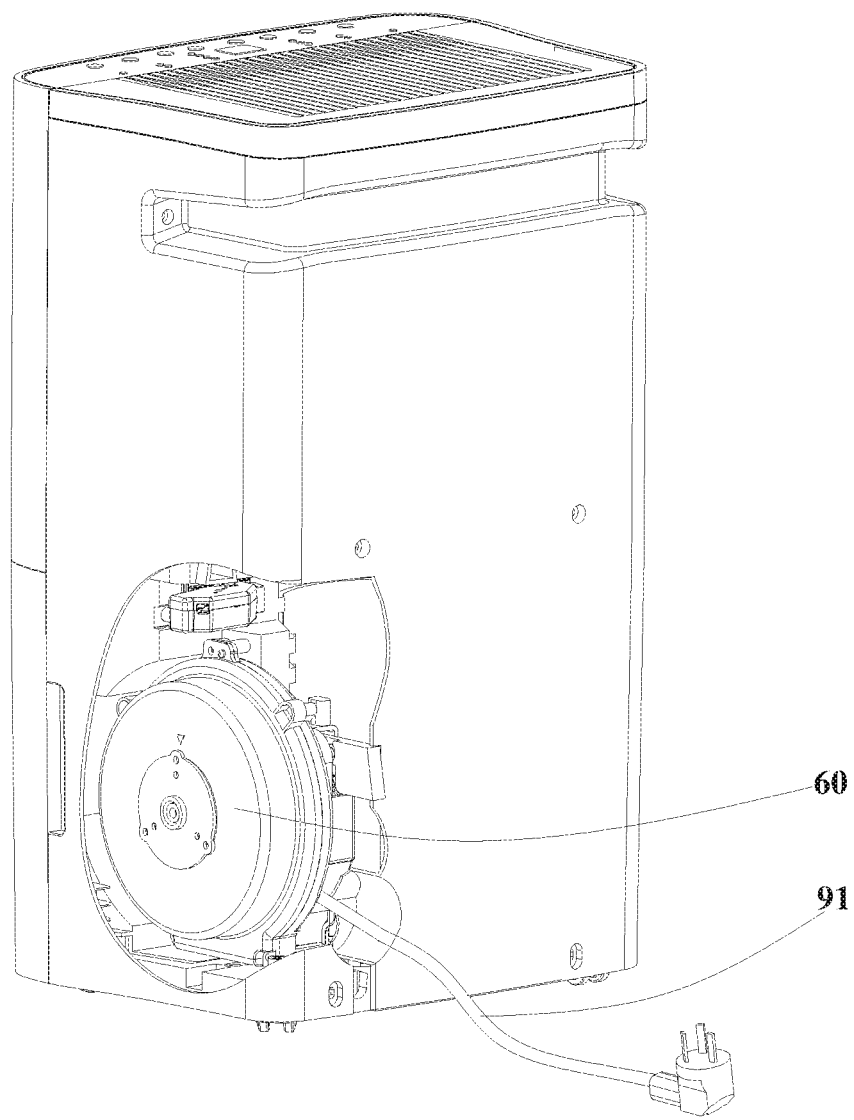
FIG. 5 is a part section view of a dehumidifier according to an embodiment of the invention.

As shown in FIG. 5, the household appliance is the dehumidifier, a housing of the dehumidifier is provided with an outlet of a first segment 91 of a power cord, the coiling device is fixed to the interior of the housing of the dehumidifier, and a mounting portion matched with an internal support of the dehumidifier fixedly is provided at a mounting box 64.

From the above descriptions, it can be seen that the embodiments of the invention achieve the technical effects as follows. The first coiling bobbin and the second coiling bobbin are provided, and the winding directions of the first segment and the second segment of the power cord are set to be identical. When the first segment of the power cord is pulled out of the first coiling groove, the first coiling bobbin drives the second coiling bobbin to rotate, and the second segment of the power cord is unwound from the second coiling groove accordingly, so that the power cord is prevented from being twisted at the point of connection between the first segment and the second segment, and therefore the aim of improving the use safety can be achieved without the elastic piece and contact structure.

The above is only the preferred embodiments of the invention, and is not intended to limit the invention. There can be various modifications and variations in the invention for those skilled in the art. Any modifications, equivalent replacements, improvements and the like within the spirit and principle of the invention shall fall within the protection scope of the invention.

The invention claimed is:

1. A coiling device configured to coil a power cord, the power cord comprising:
   a first segment and a second segment connected with each other, wherein the coiling device comprises:
   a first coiling bobbin provided with a first coiling groove, the first segment of the power cord being wound in the first coiling groove; and
   a second coiling bobbin fixedly connected with the first coiling bobbin, the second coiling bobbin being provided with a second coiling groove, the second segment of the power cord being wound in the second coiling groove, and a winding direction of the second segment of the power cord being identical to that of the first segment of the power cord,
   wherein a first limiting portion is provided on the first coiling bobbin, and the coiling device further comprises a second limiting portion fitting with the first limiting portions to limit a rotation angle of the first coiling bobbin,
   wherein the coiling device further comprises a housing, wherein the first coiling bobbin is provided on the housing rotatably, the first limiting portion is a ratchet provided at the periphery of the first coiling bobbin, and the second limiting portion is a limiting block provided on the housing, and
   wherein a rotary shaft is provided on the housing, the limiting block is provided on the rotary shaft rotatably, and the limiting block comprises a handle portion arranged outside the housing and a limiting end portion arranged inside the housing, the limiting end portion is matched with the ratchet in a clamping manner.

2. The coiling device according to claim 1, further comprising a storage assembly, wherein the storage assembly is provided with an accommodating cavity, and when the first segment of the power cord is pulled out of the first coiling bobbin, the second segment of the power cord enters the accommodating cavity from the second coiling groove.

3. The coiling device according to claim 2, wherein the storage assembly comprises a storage housing and a guide rail arranged in the storage housing, and the accommodating cavity is cooperatively formed by the guide rail and the storage housing.

4. The coiling device according to claim 2, wherein the second coiling bobbin is of an outer gear structure, the storage assembly is of an inner gear structure, the coiling device further comprises a transmission gear, and the transmission gear meshes with the second coiling bobbin and the storage assembly respectively.

5. The coiling device according to claim 1, further comprising a drive assembly in drive connection with the first coiling bobbin.

6. The coiling device according to claim 5, further comprising a housing, wherein the first coiling bobbin is provided on the housing rotatably, and the drive assembly is a coil spring mounted on the housing and connected with the first coiling bobbin.

7. The coiling device according to claim 1, wherein the second limiting portion further comprises a spring which is provided at the housing and is matched with the limiting end portion in a squeezing manner so as to allow the limiting end portion to be clamped with the ratchet under a normal state.

8. A household appliance comprising a power cord and a coiling device, wherein the coiling device is a coiling device according to claim 1.

9. The household appliance according to claim 8, comprising an appliance housing, the coiling device being detachably fixed to an interior of the appliance housing by screws.

10. A household appliance, comprising a power cord and a coiling device, wherein the coiling device is a coiling device according to claim 2.

11. A household appliance, comprising a power cord and a coiling device, wherein the coiling device is a coiling device according to claim 3.

12. A household appliance, comprising a power cord and a coiling device, wherein the coiling device is a coiling device according to claim 4.

13. A household appliance, comprising a power cord and a coiling device, wherein the coiling device is a coiling device according to claim 5.

14. A household appliance, comprising a power cord and a coiling device, wherein the coiling device is a coiling device according to claim 6.

* * * * *